United States Patent
Lekovic et al.

(10) Patent No.: US 8,372,892 B2
(45) Date of Patent: *Feb. 12, 2013

(54) ATTACHED, HIGH REACTIVITY RIGID POLYURETHANE FOAMS

(75) Inventors: Huzeir Lekovic, Troy, MI (US); Ali El-Khatib, Dearborn, MI (US); Frank Vincent Billotto, Oakland Township, MI (US); Rifat Tabakovic, Rochester Hills, MI (US); Ali Ozasahin, Plymouth, MI (US)

(73) Assignee: Dow Global Technologies LLC, Midland, MI (US)

( * ) Notice: Subject to any disclaimer, the term of this patent is extended or adjusted under 35 U.S.C. 154(b) by 480 days.

This patent is subject to a terminal disclaimer.

(21) Appl. No.: 10/564,189

(22) PCT Filed: Mar. 7, 2005

(86) PCT No.: PCT/US2005/007323
§ 371 (c)(1),
(2), (4) Date: May 11, 2007

(87) PCT Pub. No.: WO2005/090431
PCT Pub. Date: Sep. 29, 2005

(65) Prior Publication Data
US 2008/0038461 A1    Feb. 14, 2008

Related U.S. Application Data

(60) Provisional application No. 60/552,321, filed on Mar. 11, 2004.

(51) Int. Cl.
*C08G 18/08*    (2006.01)

(52) U.S. Cl. ........ 521/115; 521/116; 521/117; 521/118; 521/128; 521/129; 521/130; 521/137; 521/159; 521/164; 521/167; 521/170; 521/174

(58) Field of Classification Search ................. 521/115, 521/116, 117, 118, 128, 129, 130, 137, 159, 521/164, 167, 170, 174
See application file for complete search history.

(56) References Cited

U.S. PATENT DOCUMENTS

| | | | |
|---|---|---|---|
| 4,500,656 A | | 2/1985 | Rasshofer et al. |
| 4,645,630 A | | 2/1987 | Rasshofer et al. |
| 4,735,970 A | | 4/1988 | Sommerfeld et al. |
| 5,464,880 A | | 11/1995 | Weber et al. |
| 5,587,117 A | | 12/1996 | Eisen et al. |
| 5,789,451 A | * | 8/1998 | Guidetti et al. .............. 521/51 |
| 5,859,285 A | | 1/1999 | Guidetti et al. |
| 6,284,812 B1 | * | 9/2001 | Rotermund et al. ......... 521/174 |
| 6,699,916 B2 | | 3/2004 | Lekovic et al. |
| 6,803,390 B2 | | 10/2004 | Lekovic et al. |
| 7,714,030 B2 | * | 5/2010 | Lekovic et al. .............. 521/170 |
| 2003/0018096 A1 | * | 1/2003 | Lekovic et al. .............. 521/155 |

FOREIGN PATENT DOCUMENTS

| | | |
|---|---|---|
| WO | WO 02/079340 A1 | 10/2002 |
| WO | WO 03/037948 A1 | 5/2003 |

* cited by examiner

*Primary Examiner* — John Cooney
(74) *Attorney, Agent, or Firm* — Gary C Cohn PLLC

(57) ABSTRACT

Polyurethane foams are made and attached to a substrate having an open cavity, but reacting prepolymer and polyol components in the presence of certain carbamate blowing agents. This process allows for very fast curing, good quality, adherent foamy to be produced on, for example, vehicle parts and assemblies, for acoustical or vibration dampening and for structural reinforcement.

15 Claims, No Drawings

ATTACHED, HIGH REACTIVITY RIGID POLYURETHANE FOAMS

This application claims priority from U.S. Provisional Application No. 60/552,321 filed Mar. 11, 2004.

The present invention relates to rigid polyurethane foams, particularly rigid polyurethane foams that are useful as reinforcement materials, such as in the auto industry.

Polyurethane foams have been used in the auto and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably is low in volatile organic compounds, especially volatile isocyanates and amines. The individual components are preferably storage-stable at room temperature for an extended period.

One foaming system for these applications is based on the prepolymer described by Rizk et al. in U.S. Pat. No. 5,817,860. The prepolymer described in that patent is made by reacting an isocyanate with a monofunctional alcohol and a polyol. Foams are made from this prepolymer by reacting it with water. While good quality rigid foam can be made using this approach, it has several drawbacks. First, because the prepolymer is cured with a water stream, the volume ratio of the reactants (prepolymer and water) is often quite high, such as 15:1 or more. Much of the commercially available dispensing equipment cannot handle such high component ratios. Second, in order to get a sufficiently fast reaction with this system, it is often necessary to preheat the components to temperatures of 80° C. or more. This increases energy costs, exposes workers to high temperature reactants and reduces the viscosity of the system, thereby promoting run-off.

Approaches for improving or modifying the system of U.S. Pat. No. 5,817,860 are described in WO 02/079340A1, WO 03/037948A1 and U.S. Pat. Nos. 6,541,534 and 6,423,755. These approaches include the use of special acrylate- or methacrylate-functional materials to allow for lower curing temperatures, and the use of hollow microspheres to balance density and compressive strength.

A continuing desire is to further increase the rate at which the polyurethane system cures. Faster cure allows lower viscosity components to be used, as the fast cure causes the foam formulation to set before it has time to run off when applied to a substrate. The achievement of a faster cure must not come at the expense of a desirable foam density and necessary physical properties. In addition, the ratios of components are desirably within a range of 1:5 to 5:1, to simplify mixing and dispensing.

Very rapid cures can be obtained by increasing catalyst levels and/or using highly reactive components. The problem with these approaches is that they disorder the sequencing of the blowing and gelling reactions. This causes the foam to have a higher-than-expected density, poor physical properties, and sometimes an incomplete cure.

It would therefore be desirable to provide a rigid polyurethane system that cures very rapidly to a good quality, rigid form, particularly one that can be applied at lower volume ratios and can be applied at moderate operating temperatures.

In one aspect, this invention is a method of forming a rigid polyurethane foam attached to a substrate having an open cavity, comprising mixing a polyisocyanate component with a polyol component in the presence of a blowing agent and at least one catalyst for the reaction of a polyol with a polyisocyanate, dispensing the resulting mixture onto the substrate and subjecting the mixture to conditions sufficient to cause it to cure to form a foam having a bulk density of 3 to 40 pounds per cubic foot (48-640 kg/m$^3$) that is adherent to the substrate, wherein (a) the polyisocyanate component contains at least one compound having a plurality of free isocyanate groups, (b) the polyol component contains isocyanate-reactive materials that have an average functionality of at least about 2.0 and include at least one polyol and, (c) the volume ratio of the polyisocyanate component to the polyol component is no greater than 5:1 and no less than 1:5, (d) the ratio of isocyanate groups in the polyisocyanate component to the number of isocyanate-reactive groups in the polyol component is from about 0.7:1 to about 1.5:1;

(e) the blowing agent includes a carbamate of an alkanolamine; and (f) the cream time of the mixture is less than 2 seconds.

The process of this invention provides a method by which rigid polyurethane foam can be prepared at convenient mix ratios and at moderate operating temperatures while still allowing the formulation to very rapidly into good quality foam. The method and resulting foam is especially suitable for making foamed-in-place reinforcing, or sound- or vibration-dampening foam, especially for automotive applications, as it is easily foamed in place where reinforcement is needed.

In this invention, a polyurethane foam formulation is dispensed onto a substrate having an open cavity. By "open cavity", it is meant that the portion of the substrate into which the polyurethane foam formulation is dispensed is open to the atmosphere as the foam reacts, expands and cures. The term "cavity" is not intended to imply any particular shape or configuration, other than being open to the atmosphere. The "cavity" may be a substantially planar area, a curved area, a hollow space within the part, or other suitable shape. The cavity may be one that is incapable of retaining a fluid due to its shape or orientation.

Substrates of interest are any part or assembly to which it is desired to attach an adherent polyurethane foam. Of particular interest are vehicle parts and assemblies, especially automobile and truck parts and assemblies in which structural reinforcement, vibration dampening or sound dampening are desired. Examples of such vehicular parts include pillars, rockers, sills, sails, cowls, plenum, seams, frame rails, vehicle sub assemblies, hydro-formed parts, cross car beams and engine cradles. These may be assembled onto a vehicle or vehicle frame when the foam formulation is applied and foamed.

The foam formulation includes a polyisocyanate component, an isocyanate-reactive component, a catalyst and a carbamate blowing agent as described below.

The polyisocyanate component includes at least one organic polyisocyanate compound. Suitable polyisocyanate compounds include aromatic, aliphatic and cycloaliphatic polyisocyanates. Aromatic polyisocyanates are generally preferred based on cost, availability and properties, although aliphatic polyisocyanates are preferred in instances where stability to light is important. Exemplary polyisocyanate compounds include, for example, m-phenylene diisocyanate, 2,4-and/or 2,6-toluene diisocyanate (TDI), the various isomers of diphenylmethanediisocyanate (MDI), the so-called polymeric MDI products (which are a mixture of polymethylene polyphenylene isocyanates in monomeric MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenyl methane-4,4'-diisocyanate, 4,4',4''-triphenylmethane diisocyanate, hydrogenated polymethylene polyphenylisocyanates, toluene-2,4,6-triisocyanate and 4,4'-dimethyldiphenylmethane-2,2',5,5'-tetraisocyanate. Especially suitable polymeric MDI products have a free MDI content of from about 5 to about 40% by weight, more preferably about 10 to about 25% by weight, and have an average functionality (number of isocyanate groups per molecule) of about 2.7 to 4.0, more preferably about 2.8 to about 3.4. Such polymeric MDI products are available from The Dow Chemical Company under the trade name PAPI®.

In order to reduce the level of volatile organic compounds, increase component viscosities and balance volume ratios, the preferred polyisocyanate is an isocyanate-terminated prepolymer that is made from an excess of an organic polyisocyanate as described above and at least one polyol. The prepolymer advantageously has an isocyanate equivalent weight of from about 150, preferably from about 175, to about 500, preferably to about 350, more preferably to about 250. These isocyanate equivalent weights correspond to NCO contents of from about 28-8.4%, preferably from 24-12%, more preferably from about 24-16.8% by weight.

The polyol(s) used in making the isocyanate-terminated prepolymer has an average functionality at least about 2, advantageously about 2 to about 6, especially about 2 to about 3 and even more especially about 2 to about 2.5 hydroxyl groups per molecule. The equivalent weight per hydroxyl group can vary widely, so long as the prepolymer has the desired equivalent weight. The equivalent weight of each polyol may range from about 31 to 1500 or more, but is preferably below about 500, more preferably below about 300 and even more preferably about 200 or below.

Suitable polyols for use in making the isocyanate-terminated prepolymer include compounds such as alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide or mixtures of such alkylene oxides. Preferred polyethers are polypropylene oxides or polymers of a mixture of propylene oxide and a small amount (up to about 12 weight percent) ethylene oxide. These preferred polyethers can be capped with up to about 30% by weight ethylene oxide.

Polyester polyols are also suitable in making the prepolymer. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of about 150 or less and include ethylene glycol 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol trimethylolethane, pentaerythritol, quinitol, mannitil, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Preferred polyols for making the prepolymer are alkylene glycols, glycol ethers of up to about 75 equivalent weight, glycerine, trimethylolpropane, triethanolamine, triisopanolamine, and polypropylene oxide) polyols of up to about 200 equivalent weight.

A hydroxy-functional acrylate or methacrylate containing an acrylate ($CH_2$=CH—C(O)—) or methacrylate ($CH_2$=C($CH_3$)—C(O)—) group and an isocyanate-reactive hydroxyl group can be used to make the prepolymer, in addition to the polyisocyanate compound and polyol. Suitable hydroxy-functional acrylates and methacrylates include 2-hydroxyethyl acrylate, 2-hydroxyethyl methacrylate (HEMA), 2-hydroxylpropyl acrylate, 2-hydroxypropyl methacrylate, 4-hydroxy-n-butyl acrylate, 2-hydroxy-n-butyl acrylate, 2-hydroxy-n-butyl methacrylate, 4-hydroxy-n-butyl methacrylate, poly(oxyethylene)- and/or poly(oxypropylene)-esters of acrylic or methacrylic acid, wherein the number of oxyethylene and/or oxypropylene groups is preferably from about 2 to about 10, and the like. Of the foregoing, the methacrylates are preferred, especially when the polyol component contains primary amine compounds. HEMA is especially preferred. The equivalent ratio of the hydroxy-functional acrylate or methacrylate (when present) to polyol is advantageously from about 0.5:1, preferably from about 0.75:1 and more preferably from about 1.25:1 to about 4:1, preferably to about 3:1, even more preferably to about 2:1.

The total number of equivalents of polyol plus hydroxy-functional acrylate or methacrylate (if any) to the equivalents of starting organic polyisocyanate is advantageously such that the prepolymer has an isocyanate equivalent weight as described above.

The prepolymer is conveniently prepared by mixing the organic polyisocyanate, polyol (and hydroxy-functional acrylate or methacrylate, if used) and subjecting the mixture to conditions such that the isocyanate and hydroxyl groups react to form the prepolymer. Generally, the reaction time is at least about 10 minutes to at most about 48 hours. The temperature of the mixing and reaction step may vary over a large range, but generally is limited so that reactants do not decompose, any acrylate or methacrylate groups do not polymerize to any significant extent and the reaction proceeds at a practicable rate. A preferred temperature is from about 20-75° C. The reactants are generally contacted under a dry atmosphere and preferably under nitrogen or other inert atmosphere. When the hydroxyl-functional acrylate or methacrylate is present, it is preferred to prepare the prepolymer in the absence of materials and conditions such as free radical initiators that promote the polymerization of the acrylate and/or methacrylate groups.

A catalyst may be and preferably is used in making the prepolymer. Suitable catalysts include those described by U.S. Pat. No. 4,390,645, incorporated herein by reference. Representative catalysts include:
(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl) ether, morpholine, 4,4'-(oxydi-2,1-ethanediyl)bis and triethylenediamine;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including for example, sodium acetate, stannous octoate, stannous oleate, lead octoate, metallic driers, such as manganese and cobalt naphthenate; and (h) organometallic derivatives of tetravalent tin, trivalent and pentavalent As, Sb and Bi and metal carbonyls of iron and cobalt.

Catalysts are typically used in small amounts. For example, the total amount of catalyst used in making the prepolymer composition may be about 0.0015 to about 5, preferably from about 0.01 to about 1 percent by weight.

The polyisocyanate component may contain a plasticizer. The plasticizer may also be added after the prepolymer is made, or may be present during its formation. A plasticizer may perform several functions, such as reducing the prepolymer viscosity so it is easier to process and handle, modifying the rate of the foaming reaction, or softening or otherwise modifying the physical properties of the resulting polyurethane foam. The plasticizer is generally devoid of groups that react with the organic polyisocyanate, polyol and (if used) the hydroxy-functional acrylate or methacrylate. Examples of plasticizers include phthalates (e.g., dioctyl phthalate, diisooctyl phthalate, dimethyl phthalate, dibutyl phthalate and mixtures of phthalates, such as those sold by BASF Corporation, Mt Olive, N.J., under the trade name PLATINOL™ (such as Platinol™ 79P)), phosphates (e.g., tributyl phosphate, triphenyl phosphate and cresyl diphenyl phosphate), chlorinated biphenyls, and aromatic oils such as VYCUL™ U-V (sold by Crowley Chemicals) and Jayflex™ L9P (sold by Exxon Chemicals). The amount of plasticizer, when employed, may range over a wide range depending on the foam properties desired. Generally, the plasticizer, when present, ranges from about 1 percent to at most about 50, preferably from about 15 to about 45 percent by weight of the polyisocyanate composition.

The prepolymer composition may also be made in the presence of a surfactant, such as those described by U.S. Pat. No. 4,390,645, incorporated by reference. The surfactant is typically used if desired to help compatibilize the other components used in making the prepolymer. In addition, the surfactant may be one that plays a beneficial role in forming a foam from the prepolymer. Examples of surfactants include nonionic surfactants and wetting agents, such as those prepared by the sequential addition of propylene oxide and then ethylene oxide to propylene glycol, solid or liquid organosilicones, polyethylene glycol ethers of long chain alcohols, tertiary amine or alkylolamine salts of long chain alkyl acid sulfate esters, alkyl sulfonic esters and alkyl arylsulfonic acids. The surfactants prepared by the sequential addition of propylene oxide and then ethylene oxide to propylene glycol are preferred, as are the solid or liquid organosilicones. Non-hydrolyzable liquid organosilicones are more preferred. When a surfactant is used, it is typically present in an amount of about 0.0015 to about 1 percent by weight of the prepolymer component.

The fully formulated isocyanate component advantageously has an isocyanate equivalent weight of from about 150, preferably from about 175, to about 750, preferably to about 500, more preferably to about 400. The isocyanate functionality (exclusive of non-reactive materials such as plasticizers, surfactants and the like) is advantageously at least about 2.0, preferably at least 2.5, to about 4.0, preferably to about 3.5, more preferably to about 3.2 isocyanate groups/molecule on average.

The polyisocyanate component also preferably contains less than 25%, more preferably less than about 15%, especially 5% by weight or less of isocyanate-containing compounds having a molecular weight of 300 or less. Having such a low monomeric isocyanate content substantial reduces the risks of polyisocyanate inhalation exposure, so costly engineering controls such as downdraft ventilation can be substantially reduced or potentially eliminated.

The polyol component includes a polyol or mixture of polyols. The polyol component will most typically include a blend of two or more different polyols. The functionality (average number of isocyanate-reactive groups/molecule) of the polyol component (including polyols and amine-functional compounds as described below, but exclusive of non-isocyanate reactive materials, if present, is at least about 2.0, preferably at least 2.3 and more preferably at least 2.5.

Suitable polyols are compounds having at least two isocyanate-reactive hydroxyl groups per molecule, provided that the polyol component has an average functionality of at least about 2.0, preferably at least 2.3 and more preferably at least about 2.5, to about 6.0, preferably to about 4.0. The functionality of the individual polyols preferably ranges from about 2 to about 12, more preferably from about 2 to about 8. As is discussed more fully below, mixtures of one or more polyols together with other isocyanate-reactive compounds are preferred. The hydroxyl equivalent weight of the individual polyols may range from about 31 to about 2000 or more. Preferably, the hydroxyl equivalent weight of the individual polyols is from about 31 to about 500, more preferably from about 31 to about 250, even more preferably from about 31 to about 200.

The equivalent weight of the polyol component as a whole is selected such that when the ratio of isocyanate groups in the polyisocyanate component to the number of isocyanate-reactive groups in the polyol component is from about 0.7:1 to about 1.5:1, the volume ratio of polyisocyanate to polyol component is in the range of 4:1 to 1:4, preferably 2:1 to 1:2, especially 1.5:1 to 1:1.5.

Among the suitable polyols are those described above as components of the isocyanate-terminated prepolymer.

It is preferred that the polyol component includes a tertiary amine-containing polyol and/or an amine-functional compound. The presence of these materials tends to increase the reactivity of the polyol component during the early stages of its reaction with the polyisocyanate component. This in turn helps the reaction mixture to build viscosity more quickly when first mixed and applied without unduly decreasing cream time, and thus reduces run-off or leakage.

Such tertiary amine-containing polyols include, for example, triisopropanol amine, triethanolamine and ethylene and/or propylene oxide adducts of ethylene diamine, toluene diamine or aminoethylpiperazine having a molecular weight of up to about 800, preferably up to about 400. Also of interest are the so-called "Mannich" polyols, which are the alkoxylated reaction products of a phenol, formaldehyde and a secondary amine. When present, tertiary amine-containing polyols may constitute a minor or a major component of the polyol component. (In this invention, a "major" or "main" amount or a "major" or "main" component is one constituting at least 50 weight percent of the polyol component as a whole.) For example, the tertiary amine-containing polyol may constitute from about 1 to about 80% by weight of the polyol component.

The amine-functional compound is a compound having at least two isocyanate-reactive groups, of which at least one is a primary or secondary amine group. Among these are monoethanolamine, diethanolamine, monoisopropanol amine, diisopropanol amine and the like, and aliphatic polyamines such as aminoethylpiperazine, diethylene triamine, triethylene tetraamine and tetraethylenepentaamine. Also included among these compounds are the so-called aminated polyethers in which all or a portion of the hydroxyl groups of a polyether polyol are converted to primary or secondary amine groups. Suitable such aminated polyethers are sold by Huntsman Chemicals under the trade name JEFFAMINE®. Typical conversions of hydroxyl to amine groups for these commercial materials range from about 70-95%, and thus these commercial products contain some residual hydroxyl groups in addition to the amine groups. Preferred among the aminated polyethers are those having a weight per isocyanate-reactive group of about 100-1700 daltons, especially about 100-250 daltons, and having 2-4 isocyanate-reactive groups per molecule.

These amine-functional compounds advantageously constitute no greater than about 30 weight percent, preferably from about 0.25 to about 15 weight percent, especially from about 1 to about 5 weight percent of the total weight of the polyol component.

In order to impart toughness to the foam, a minor amount of a high (i.e. 800 or higher, preferably about 1500-3000) equivalent weight polyol may be added to the polyol component, as well. This high equivalent weight polyol is preferably a polyether polyol having two to three hydroxyl groups per molecule. It more preferably is a polypropylene oxide) that may be end-capped with up to 30% (by weight of the polyol) of poly(ethylene oxide). The high equivalent weight polyol may contain dispersed polymer particles. These materials are commercially known and are commonly referred to as "polymer polyols" (or, sometimes "copolymer polyols"). The dispersed polymer particles may be, for example, polymers of a vinyl monomer (such as styrene, acrylonitrile or styrene-acrylonitrile particles), polyurea particles or polyurethane particles. Polymer or copolymer polyols containing from about 2 to about 50% or more by weight dispersed polymer particles are suitable. When used, this polymer or copolymer polyol may constitute up to about 45%, preferably from about 5 to about 40%, of the weight of all isocyanate-reactive materials in the polyol component.

The blowing agent includes a carbamate of an amine containing at least one hydroxyl group. The amine preferably also contains at least one, preferably one or two, ether groups per molecule. Suitable carbamates are conveniently prepared by reacting an alkanolamine with carbon dioxide, as described, for example, in U.S. Pat. Nos. 4,735,970, 5,464,880, 5,587,117 and 5,859,285, all incorporated herein by reference. Alkanolamines of interest include, for example, N-methyl-2-aminoethanol, N-ethyl-2-aminoethanol, 2-(2-N-methyl-aminoethyl)-1,2-ethanediol, N,N'-bis-(β-hydroxyethyl)-ethylene diamine, N,N'-bis-(β-hydroxypropyl)ethylene diamine, N,N'-bis-(β-hydroxyethyl)-1,2-propylene diamine, N,N'-bis-(β-hydroxypropyl)-1,3-propane diamine, N,N'-bis-(β-hydroxyethyl)-1-methyl-2,4- and -2,6-diaminocyclohexane, N,N'-bis-(β-hydroxypropyl)-p-xylylene diamine, N-(β-hydroxyethyl-N'-(β-hydroxypropyl) ethylene diamine or tris-(β-hydroxyethyl)-1,6,11 triaminoundecane. Other suitable alkanolamines have the general structure

$$HR^1N-(CR^2R^3)_n-OH \quad (I)$$

where $R^1$ is hydrogen, a $C_1$-$C_5$ alkyl group or a group of the structure $(CR^2R^3)_n$, $R^2$ are each independently hydrogen or $C_1$-$C_5$ alkyl groups and n is an integer from 2 to 6.

Especially preferred alkanolamines have the structure

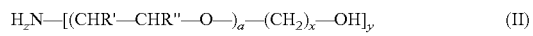

$$H_2N-[(CHR'-CHR''-O-)_a-(CH_2)_x-OH]_y \quad (II)$$

where y is at least one, z+y equals 3, R' and R'' are independently hydrogen, ethyl or methyl, x is a number from 1 to 4, and a is 1 or 2, provided that a times y is not greater than 2. Especially preferred alkanolamines of this type are 2-(2-aminoethoxy)ethanol and 2(2-(2-aminoethoxyl)ethoxy)ethanol.

The carbamate is conveniently contained in a non-aqueous liquid medium in order to reduce its viscosity to a desirable level. By "non-aqueous", it is meant that the liquid medium contains less than 0.5 weight percent water, preferably less than 0.2 weight percent water. The liquid medium may be an aprotic or a protic material. Protic materials are, for purposes of this invention, those that contain isocyanate-reactive groups, particularly one or more hydroxyl groups. Diol and triol liquid media are preferred, such as an alkylene glycol or triol, a polyoxyalkylene diol or triol such as a poly(oxyethylene) glycol or triol or a poly(oxypropylene) glycol or triol. The diol or triol preferably has a molecular weight from about 31 to about 1000, preferably from 31 to 600 and more preferably from 31 to about 400. Examples of suitable diols and triols include ethylene glycol, 1,2- or 1,3-propane diol, 1,5-pentane diol, 1,2-, 1,3- or 1,4-butanediol, glycerine, diethylene glycol, dipropylene glycol and ethylene oxide, propylene oxide or butylene oxide adducts of any of these. The liquid medium may constitute from 5 to 95%, preferably about 25-75%, and more preferably from about 40-60% of the combined weight of medium and carbamate.

The carbamate can be prepared using methods described in U.S. Pat. Nos. 4,735,970, 5,464,880, 5,587,117 and 5,859,285. In general, carbon dioxide is combined with the amine under atmospheric or superatmospheric pressure, at a temperature from 0 to 100° C., in the presence of the liquid medium (if any). Temperatures in the range of 0-40° C. are preferred. As the reaction is often exothermic, cooling or other temperature control means may be employed to moderate the temperature. Up to a stoichiometric amount of carbon dioxide may be used. However, it is possible to use less than a stoichiometric level of carbon dioxide, in which case some unreacted amine may remain in the carbamate mixture.

A suitable commercially available carbamate mixture is Specflex™ NR 566, available from The Dow Chemical Company. This product contains a carbamate of an alkanolamine of structure II above, and contains about 45% of a glycol liquid medium.

The carbamate may be the sole blowing agent. In such cases, enough of the carbamate is used to provide the foam with the desired density. When used as the sole blowing agent, foam densities in the range of about 10 to about 40 pounds/cubic foot (160-640 kg/m³) can be easily prepared. Preferred foam densities are about 10 to about 25 pounds/cubic foot (192-400 kg/m$^3$) when the carbamate is the sole blowing agent. On a neat basis (i.e., exclusive of any liquid medium that may be present), suitable amounts of carbamate are from about 0.5 to about 10 parts by weight per 100 parts by weight polyol component. A more suitable range is from about 0.75 to about 5 parts of carbamate per 100 parts by weight polyol component.

Other blowing agents may be incorporated into the reaction mixture to further assist the expansion or obtain lower density foam. These include physical blowing agents such as low boiling hydrocarbons, hydrofluorocarbons, fluorocarbons, chlorofluorocarbons, hydrochlorofluorocarbons and the like. These preferably have boiling temperatures in the range from about 50 to about 120° C. Water is a useful auxiliary blowing agent, as it will react with isocyanate groups on the prepolymer to generate carbon dioxide and crosslink the polymer. Somewhat lower foam densities, as low as 48 kilograms/cubic meter or lower, preferably as low as 80 kilograms/cubic meter, can be obtained when auxiliary blowing agents are used. It is preferred to use the amounts of carbamate blowing agent indicated before, even when an auxiliary blowing agent is present, in order to obtain the desired short cream times.

A catalyst for the reaction of the polyol with an isocyanate is used in the method. Most typically, this catalyst will be incorporated into the polyol component, but in some cases can be mixed into the polyisocyanate component or added as a separate stream. Suitable catalysts are described above with respect to the making of the prepolymer. However, tertiary amine catalysts are preferred, and especially preferred are the so-called "reactive" amine catalysts that contain a hydroxyl or primary or secondary amine group that can react with an isocyanate to become chemically bonded into the foam. Among these especially preferred catalysts are N,N,N-trimethyl-N-hydroxyethyl-bis (aminoethyl) ether (available from Huntsman Chemical under the trade name ZF-10) and dimethyl 1-2 (2-aminoethoxy) ethanol (available from Nitrol-Europe under the trade name NP-70), and those sold by Air Products under the trade names Dabco™ 8154 and Dabco™ T.

The amount of catalyst is selected in conjunction with the other components to provide the desired fast cream time. The cream time, i.e., that time after mixing the polyisocyanate and polyol components that a visible reaction occurs, is 2 seconds or less, preferably 1.5 seconds or less and more preferably 1 second or less. The amount of catalyst needed will depend somewhat on the particular catalyst. Generally, the amounts described before with respect to the making of the prepolymer are suitable.

In addition, the polyol component and/or the prepolymer component can contain various auxiliary components as may be useful in making a rigid foam, such as surfactants, fillers, colorants, odor masks, flame retardants, biocides, antioxidants, UV stabilizers, antistatic agents, thixotropic agents and cell openers.

Suitable surfactants include commercially available polysiloxane/polyether copolymers such as Tegostab (trademark of Goldschmidt Chemical Corp.) B-8462 and B-8404, and DC-198 and DC-5043 surfactants, available from Dow Corning.

Examples of suitable flame retardants include phosphorous compounds, halogen-containing compounds and melamine.

Examples of fillers and pigments include calcium carbonate, titanium dioxide, iron oxide, chromium oxide, azo/diazo dyes, phthalocyanines, dioxazines and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Examples of cell openers include silicon-based antifoamers, waxes, finely divided solids, liquid perfluorocarbons, paraffin oils and long chain fatty acids.

The foregoing additives are generally used in small amounts, such as from about 0.01 percent to about 1 percent by weight of the polyisocyanate component.

Foam according to the invention is prepared by mixing the polyol and polyisocyanate components in the presence of the catalyst and carbamate (and other, optional ingredients), dispensing the mixture onto a substrate as described before, and allowing the reactants to react and form an attached foam. Although this invention is not limited to any theory, it is believed that the carbamate reacts very rapidly with isocyanate groups, releasing $CO_2$ simultaneously with forming a urea linkage to the isocyanate group. Because a single reaction causes both gelling and blowing, sequencing these reactions ceases to be a significant problem. Initial viscosity build is very fast due to the reaction of the isocyanate groups with the amine groups liberated from the carbamate. This allows the generated gas to be entrained in the reacting mixture and therefore cause it to expand.

Another advantage of this invention is that these very fast cream times can be obtained even when the components are mixed at ambient to moderately elevated temperatures, such as from about 20 to about 75° C., preferably from about 30-60° C. This simplifies handling and applying the foam. Yet another advantage of the invention is that because of the low volume ratios of the polyol and isocyanate components, a variety of commonly available mixing and dispensing equipment can be used.

The foam formulation in addition preferably has a tack-free time of less than 20 seconds, preferably less than 15 seconds and more preferably from about 9-12 seconds.

The foam formulation cures in place, generally without the further application of additional heat or energy for curing, although heating can be used if desired to speed the cure. It is usually not necessary to apply heat to effect a full expansion and cure.

The ratios of the polyisocyanate and polyol components are advantageously selected so as to provide an isocyanate index (ratio of NCO to isocyanate-reactive groups) of about 0.7, preferably about 0.85, more preferably about 0.95, to about 1.5, preferably to about 1.25, more preferably to about 1.15. The polyol component and the isocyanate component are mixed in a volume ratio of from 5:1 to 1:5, preferably from 4:1 to 1:4, more preferably from about 2:1 to 1:2, even more preferably from about 1.5:1 to 1:1.5.

The following examples are provided to illustrate the invention, but are not intended to limit the scope thereof. All parts and percentages are by weight unless otherwise indicated.

EXAMPLE 1

Prepolymer Component A is made by mixing the following components together under a nitrogen atmosphere and heating at 71° C. until a constant NCO content is obtained:

| Component | Parts by Weight | Equivalent Weight | Functionality |
|---|---|---|---|
| Hydroxyethyl methacrylate | 4.7 | 131 | 1 |
| 400 MW Poly(propylene oxide) diol | 1.88 | 200 | 2 |

-continued

| Component | Parts by Weight | Equivalent Weight | Functionality |
|---|---|---|---|
| Polymeric MDI | 68.37 | 141 | 3.2 |
| Plasticizer (Jayflex ™ L9P) | 25.0 | — | 0 |
| Benzoyl Chloride | 0.025 | — | Stabilizer |

The resulting plasticized Prepolymer Component A has a % NCO of ~12% weight percent. The free MDI content of Prepolymer Component A is ~19% by weight.

Polyol Component A is made by mixing the following ingredients:

| Ingredient | Parts by Weight | Equivalent Weight | Functionality |
|---|---|---|---|
| Amine-initiated polyol (Voranol 391, Dow Chemical) | 80 | 143.5 | 4 |
| Polyether polyol 1 (PG 76-600, Arch Chemicals) | 5.00 | 93.5 | 3 |
| Polyether polyol 2 (PG 76-120, Arch Chemicals) | 67.750 | 467.5 | 3 |
| Primary amine-terminated polyether (Jeffamine ® T403 from Huntsman Chemicals) | 2.5 | 156 | 3 |
| Carbamate/ethylene glycol mixture[1] (Specflex NR 566, from Dow Chemical) | 1.5 | — | — |
| Organotin Catalyst (UL-1 from Air Products and Chemicals) | 0.25 | — | — |
| Organosilicone Surfactant (Tegostab B-8404, Goldschmidt) | 1 | — | — |

[1]Contains approximately 45% ethylene glycol by weight.

Foam is prepared by mixing Prepolymer Component A and Polyol Component A at a 1:1 volume ratio at the mixing head of a Gusmer H7 foaming machine at a dispensing pressure of 500-1200 psi (3447-8274 kPa), dispensing the mixture into a 1-quart cup, and allowing it to cure at room temperature. Both components are preheated to 160° F. (71° C.) to reduce the viscosity and obtain better mixing. Cream time for this formulation is less than one second. A stable foam having excellent cell structure and a density of about 12 pounds per cubic foot (192 kg/m$^3$) is obtained.

EXAMPLE 2

Prepolymer Component B is made by reacting 44.377 parts of Papi® 20 polymeric MDI (29.5% NCO, 3.2-functional), from Dow Chemical with 10.706 parts of a 216 equivalent weight polypropylene oxide) diol (Voranol® 220-260 polyol from Dow Chemical), 2.567 parts n-butanol, 42 parts of a non-reactive plasticizer (Platinol 711P from BASF), and 0.35 parts of an organosilicone surfactant (DC198 from Air Products).

The resulting plasticized Prepolymer Component A has a % NCO of 9.7 weight percent, an equivalent weight of 429, a $M_n$ of 1000 (exclusive of plasticizer) and an average functionality of 2.52 isocyanate groups/molecule (exclusive of plasticizer). The free MDI content of Prepolymer Component A is <5%.

Polyol Component B is made by mixing the following ingredients:

| Ingredient | Parts by Weight | Equivalent Weight | Functionality |
|---|---|---|---|
| Carbamate/ethylene glycol mixture[1] (Specflex NR 566, from Dow Chemical) | 11.8 | 43.9 | 2 |
| Amine-initiated polyol (Voranol ® 800 polyol from Dow Chemical) | 26 | 70 | 4 |
| Poly(propylene oxide) polyol (Voranol ® 391 polyol from Dow Chemical) | 49.45 | 143.5 | 4 |
| Primary amine-terminated polyether (Jeffamine ® T403 from Huntsman Chemicals) | 1.5 | — | 3 |
| Amine curing agent (D.E.H 39, from Dow Chemical) | 2.75 | 64.5 | 3 |
| Tertiary amine catalyst (SPI 847, from Specialty Products International) | 2.5 | — | — |
| Silicone Surfactant (Tegostab ® 8450, from Th. Goldschmidt) | 5 | — | — |
| Water | 1 | 9 | 2 |

Foam Example 2 is prepared by mixing Prepolymer Component B and Polyol Component B in the general manner described in Example 1, except the component weight ratio is 4:1. The resulting foam has a cream time of less than 2 seconds and a tack free time of less than 15 seconds. Its free rise density is 12-14 pounds/cubic foot (192-224 kg/m$^3$). The compressive modulus of a 2"×2"×1" (5×5×2.5 cm) skinless section of the resulting foam is measured according to ASTM after preconditioning the foam at 50° C. for one hour. The compression modulus is ~9000 psi (~62,000 kPa).

EXAMPLE 3

Polyol Component C is made by mixing the following ingredients:

| Ingredient | Parts by Weight | Equivalent Weight | Functionality |
|---|---|---|---|
| Carbamate/ethylene glycol mixture[1] (Specflex NR 566, from Dow Chemical) | 8 | 43.9 | 2 |
| Amine-initiated polyol (Voranol ® 800 polyol from Dow Chemical) | 27 | 70 | 4 |
| Poly(propylene oxide) polyol (Voranol ® 391 polyol from Dow Chemical) | 58.6 | 143.5 | 4 |
| Primary amine-terminated polyether (Jeffamine ® T403 from Huntsman Chemicals) | 1.5 | — | 3 |
| Amine curing agent (D.E.H 39, from Dow Chemical) | 3.5 | 64.5 | 3 |
| Amine Catalyst (Dabco WT catalyst from Air Products) | 1.25 | — | — |
| Odor Modifier (10125WS from Odor Control Co.) | 0.15 | — | — |

Foam Example 3 is prepared by mixing Prepolymer Component B and Polyol Component D in the general manner described in Example 2. The resulting foam has a cream time of less than 2 seconds and a tack free time of less than 20 seconds. Its free rise density is 22-24 pounds/cubic foot (352-384 kg/m$^3$). Compression modulus measured as in Example 2 is 28,000 psi (193,000 kPa).

EXAMPLE 4

A polyisocyanate composition is prepared by mixing 65 parts by weight of a 3.2-functional, 141 equivalent weight polymeric MDI (Papi® 20, from Dow Chemical) with 35 parts of a hydrocarbon oil. Foam Example 4 is prepared by reacting it with Polyol Component C, in the same general manner as described in Example 1, except the volume ratio is 2:1 and the isocyanate index is 1.34. The cream time is less than one second and tack free time is less than 20 seconds. Polyol Composition D is made by blending the following components:

| Ingredient | Parts by Weight | Equivalent Weight | Functionality |
|---|---|---|---|
| Carbamate/ethylene glycol mixture[1] (Specflex NR 566, from Dow Chemical) | 8.2 | 43.9 | 2 |
| Polyether polyol (Voranol ® 280 polyol from Dow Chemical) | 23.36 | 200 | 7 |
| Polyether polyol (Voranol ® 391 polyol from Dow Chemical) | 51.4 | 143.5 | 4 |
| Primary amine-terminated polyether (Jeffamine ® T403 from Huntsman Chemicals) | 8.6 | 156 | 3 |
| Tertiary amine catalyst (SPI 847, from Specialty Products International) | 1.6 | — | — |
| Reactive amine catalyst (Debco NE-200, from Air Products) | 4.54 | 210 | 1 |
| Silicone Surfactant (Tegostab ® 8404, from Th. Goldschmidt) | 2.3 | — | — |

The invention claimed is:

1. A method of forming a rigid polyurethane foam attached to an automotive part having an open cavity, comprising mixing a polyisocyanate component with a polyol component in the presence of at least one catalyst for the reaction of a polyol with a polyisocyanate and a blowing agent, dispensing the resulting mixture onto an automotive part defining an open cavity and subjecting the mixture to conditions sufficient to cause the mixture to cure to form a foam having a bulk density of 3 to 40 pounds per cubic foot (48-640 kg/m$^3$) that is adherent to the automotive part, wherein
   (a) the polyisocyanate component contains at least one compound having a plurality of free isocyanate groups,
   (b) the polyol component contains isocyanate-reactive materials that have an average functionality of at least about 2.3 and includes at least one polyol and,
   (c) the volume ratio of the polyisocyanate component to the polyol component is no greater than 5:1 and no less than 1:5,
   (d) the ratio of isocyanate groups in the polyisocyanate component to the number of isocyanate-reactive groups in the polyol component is from about 0.7:1 to about 1.25:1;
   (e) the blowing agent consists of a carbamate of an alkanolamine or a mixture of water and a carbamate of an alkanolamine; and
   (f) the cream time of the mixture is less than 2 seconds.

2. The method of claim 1 wherein the carbamate is contained in a non-aqueous medium.

3. The method of claim 2 wherein the carbamate is a reaction product of carbon dioxide and N-methyl-2-aminoethanol, N-ethyl-2-aminoethanol, 2-(2-N-methyl-aminoethyl)-1,2-ethanediol, N,N'-bis-(β-hydroxyethyl)-ethylene diamine, N,N'-bis-(β-hydroxypropyl)ethylene diamine, N,N'-bis-(β-hydroxyethyl)-1,2-propylene diamine, N,N'-bis-(β-hydroxypropyl)-1,3-propane diamine, N,N'-bis-(β-hydroxyethyl)-1-methyl-2,4-diaminocyclohexane N,N'-bis-(β-hydroxyethyl)-1-methyl-2,6-diaminocyclohexane, N,N'-bis-(β-hydroxypropyl)-p-xylylene diamine, N-(β-hydroxyethyl-N'-(β-hydroxypropyl)ethylene diamine or tris-(β-hydroxyethyl)-1,6,11 triaminoundecane.

4. The method of claim 2 wherein the carbamate is the reaction product of carbon dioxide and an alkanolamine having the structure

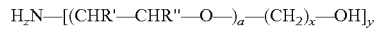

where y is at least 1, z+y equals 3, R' and R" are independently hydrogen, ethyl or methyl, x is a number from 1 to 4, and a is 1 or 2, provided that a times y is not greater than 2.

5. The method of claim 4 wherein the alkanolamine is 2-(2-aminoethoxy)ethanol or 2-(2-(2-aminoethoxy)ethoxy)ethanol.

6. The method of claim 1 wherein the isocyanate component includes a isocyanate-terminated prepolymer which is a reaction product of an organic polyisocyanate and at least one polyol.

7. The method of claim 1 wherein the isocyanate component includes a isocyanate-terminated prepolymer which is a reaction product of an organic polyisocyanate, at least one polyol and a hydroxyl-functional acrylate or methacrylate.

8. The method of claim 6 wherein the polyisocyanate component includes at least one plasticizer.

9. The method of claim 1 wherein at least one polyol in the polyol component contains a tertiary amine group.

10. The method of claim 1 wherein the polyol component contains at least one amine-terminated polyether.

11. The method of claim 1 wherein the blowing agent is blended into the polyol component before the polyol component and polyisocyanate component are mixed.

12. The method of claim 1 wherein the catalyst is blended into the polyol component before the polyol component and polyisocyanate component are mixed.

13. The method of claim 1 wherein the cream time is less than 1 second.

14. The method of claim 1 wherein the automotive part is assembled onto a vehicle or vehicle frame when the foam formulation is applied and foamed.

15. The method of claim 14 wherein the automotive part is a pillar, rocker, sill, sail, cowl, plenum, seam, frame rail, vehicle sub assembly, hydro-formed part, cross car beam or engine cradle.

* * * * *